(12) United States Patent
Tani et al.

(10) Patent No.: US 6,525,946 B2
(45) Date of Patent: Feb. 25, 2003

(54) SWITCHING POWER SUPPLY UNIT, AND ELECTRONIC APPARATUS INCORPORATING THE SAME

(75) Inventors: Ryota Tani, Nagaokakyo (JP); Tomohiro Yamada, Nagaokakyo (JP); Kentaro Takahashi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/004,865

(22) Filed: Dec. 7, 2001

(65) Prior Publication Data

US 2002/0093837 A1 Jul. 18, 2002

(30) Foreign Application Priority Data

Jan. 17, 2001 (JP) ........................................ 2001-008921

(51) Int. Cl.[7] ............................................. H02M 3/335
(52) U.S. Cl. ................................. 363/21.07; 363/21.15
(58) Field of Search .......................... 363/16, 20, 20.01, 363/21.04, 21.07, 21.12, 21.15, 95, 97, 131

(56) References Cited

U.S. PATENT DOCUMENTS

| 5,675,485 A | * | 10/1997 | Seong .......................... 363/97 |
| 5,862,044 A | * | 1/1999 | Shioya et al. .................. 363/21 |
| 6,111,763 A | * | 8/2000 | Hanabusa et al. ............. 363/21 |
| 6,362,980 B1 | * | 3/2002 | Ohashi et al. ............ 363/21.01 |

* cited by examiner

*Primary Examiner*—Matthew Nguyen
(74) *Attorney, Agent, or Firm*—Keating & Bennett, LLP

(57) ABSTRACT

A switching power supply unit and an electronic apparatus including the same, has a photocoupler that is used for providing feedback from the secondary side to the primary side. The photocoupler is shielded by a heat sink so that incorrect operation of the photocoupler caused by electromagnetic waves emanating from cellular phones or other electronic apparatuses is prevented, thereby preventing incorrect operation of the switching power supply unit and the electronic apparatus.

20 Claims, 2 Drawing Sheets

_US 6,525,946 B2_

SWITCHING POWER SUPPLY UNIT, AND ELECTRONIC APPARATUS INCORPORATING THE SAME

BACKGROUND OF THE INVENTION

1. Field of the Invention

The present invention relates to a switching power supply unit and an electronic apparatus incorporating the switching power supply unit.

2. Description of the Related Art

Typically, in a switching power supply unit, a photocoupler including a light-emitting device and a phototransistor is used for providing feedback from the secondary side to the primary side while also providing insulation between the primary side and the secondary side. In that case, the light-emitting device is connected to an output voltage detecting circuit connected to a rectifying circuit on the secondary side, and the phototransistor is connected to a control circuit connected to a control terminal of a switching element on the primary side. By using the photocoupler arranged to provide feedback from the secondary side to the primary side as described above, short-circuiting between the primary side and the secondary side is prevented even if damage to the feedback circuitry occurs.

Due to the recent development of wireless devices such as cellular phones, electronic apparatuses incorporating switching power supply units have experienced problems in that electromagnetic waves emanating from cellular phones and electronic apparatuses, cause an incorrect operation of a photocoupler and in turn cause an incorrect operation of a power supply, resulting in various incorrect operations, such as a reset, of the electronic apparatuses.

SUMMARY OF THE INVENTION

In order to overcome the problems described above, preferred embodiments of the present invention provide a switching power supply unit and an electronic apparatus incorporating such a power supply unit, which are not susceptible to incorrect operations caused by electromagnetic waves.

According to one preferred embodiment of the present invention, a switching power supply unit includes a transformer having at least a primary winding and a secondary winding, a switching element connected in series with the primary winding, a control circuit connected to a control terminal of the switching element, a rectifying circuit connected to the secondary winding, an output voltage detecting circuit connected to the rectifying circuit, a photocoupler which feeds an output voltage detected by the output voltage detecting circuit back to the control circuit, and a shield member arranged to electromagnetically shield the photocoupler.

The photocoupler may be covered by the shield member on the top side thereof. Also, the photocoupler may be surrounded by the shield member.

Furthermore, the shield member may be a heat sink made of metal.

According to another preferred embodiment of the present invention, an electronic apparatus includes the switching power supply unit according to the preferred embodiment described above.

In the switching power supply unit and the electronic apparatus of preferred embodiments of the present invention, incorrect operation caused by electromagnetic waves emanating from cellular phones and other electronic apparatuses is prevented.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Figure 1:
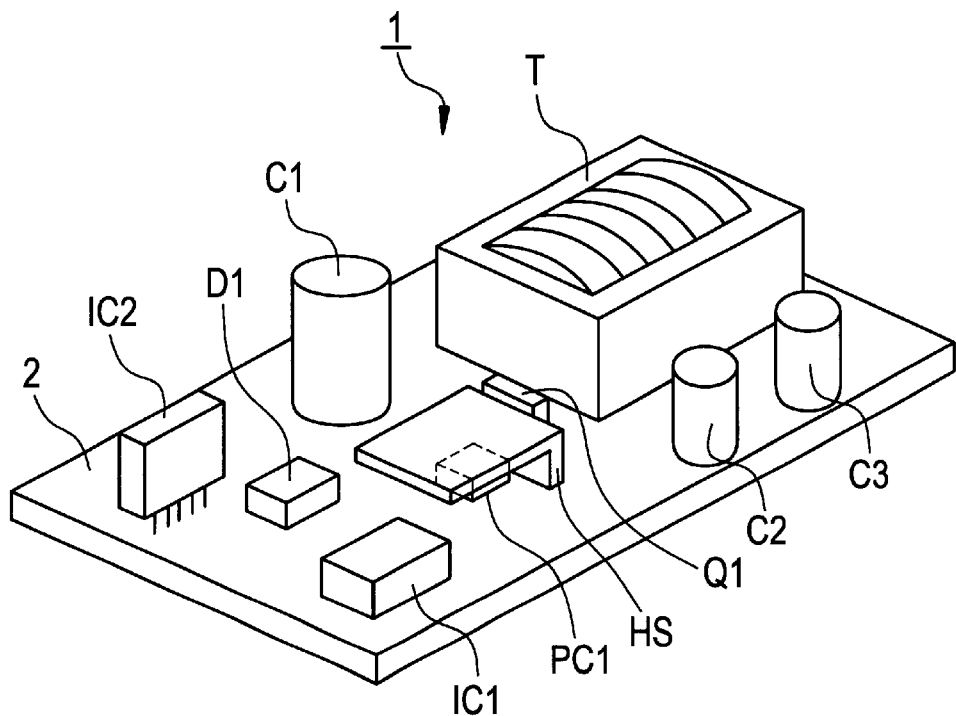
FIG. 1 is a perspective view of a switching power supply unit according to a preferred embodiment of the present invention.
Figure 2:
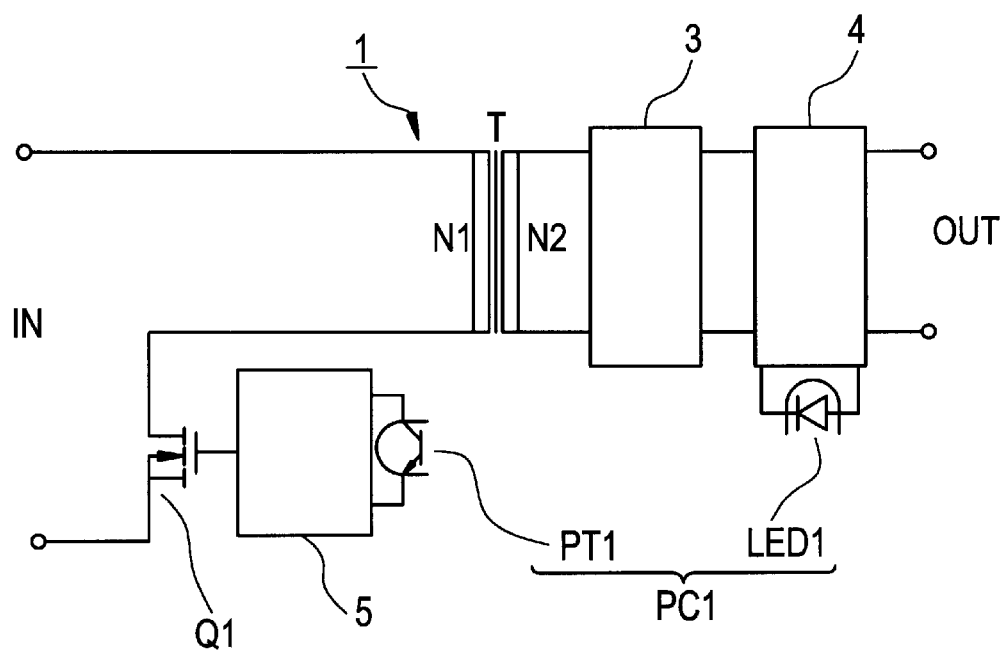
FIG. 2 is a schematic circuit diagram of the switching power supply unit shown in FIG. 1.

FIG. 1 is a perspective view of a switching power supply unit according to a preferred embodiment of the present invention, and FIG. 2 is a schematic circuit diagram thereof.

Referring to FIG. 1, a switching power supply unit 1 preferably includes a component-mounting substrate 2, a transformer T having a primary winding and a secondary winding and being mounted on the component-mounting substrate 2, a switching element Q1, a heat sink HS bonded to the switching element Q1, a diode D1, integrated circuits IC1 and IC2, a photocoupler PC1, and capacitors C1, C2, and C3.

As shown in FIG. 2, the switching element Q1 is connected in series with the primary winding N1 of the transformer T. The secondary winding N2 of the transformer T is connected to a rectifying circuit 3, and the rectifying circuit 3 is connected to an output voltage detecting circuit 4. The control terminal of the switching element Q1 is connected to a control circuit 5.

The diode D1 shown in FIG. 1 is a rectifying diode on the secondary side, and is included in the rectifying circuit 3 shown in FIG. 2. The IC1 is an integrated circuit for detecting an output voltage, and is included in the output voltage detecting circuit 4 shown in FIG. 2. The IC2 is an integrated circuit for controlling the switching element Q1, and is included in the control circuit 5 shown in FIG. 2. The output voltage detecting circuit 4 is connected to a light-emitting device LED1, and the control circuit 5 is connected to a phototransistor PT1. The light-emitting device LED1 and the phototransistor PT1 constitute a photocoupler PC1. In FIG. 2, non-circuit elements including the component-mounting substrate 2 and the heat sink HS shown in FIG. 1 are not shown.

In the switching power supply unit 1 constructed as described above, a DC voltage input from a DC power supply connected to the primary side is switched by the switching element Q1, transferred to the secondary side via the transformer T as an AC voltage, and rectified in the rectifying circuit 3 before being output. The output voltage is detected by the output voltage detecting circuit 4, and transferred to the control circuit 5 via the photocoupler PC1. In accordance with the output voltage detected by the output voltage detecting circuit 4, the control circuit 5 varies the switching frequency or duty so that the output voltage will be constant, maintaining the output voltage stable.

Furthermore, as shown in FIG. 1, the photocoupler PC1 is disposed in proximity to the heat sink HS and is covered by the heat sink HS on the top side thereof. The heat sink is a metallic component preferably made of iron, aluminum, or other suitable material. The heat sink HS electromagnetically shields the photocoupler PC1 from interference caused by external electromagnetic waves emanating from cellular phones or other electronic apparatuses, thereby preventing incorrect operation of the photocoupler PC1. Accordingly, incorrect operation of the switching power supply unit 1 caused by interference from external electromagnetic waves is prevented.

Furthermore, because the shielding of the photocoupler PC1 is achieved by using the heat sink HS which is provided primarily for a different purpose, there is no need to cover the entire unit with a shield case, thereby reducing the size of switching power supply units.

Although the photocoupler PC1 is covered by the heat sink HS on the top side thereof in the switching power supply unit 1 shown in FIG. 1, the shielding effect can also be obtained to a certain extent by simply disposing a heat sink in proximity to the photocoupler PC1. On the contrary, the shielding effect can be improved by surrounding the photocoupler PC1 with a heat sink on three sides or four sides thereof.

Furthermore, although the heat sink HS provided for the switching element Q1 on the primary side is used to shield the photocoupler PC1 in the switching power supply unit 1, the shielding may be achieved using a heat sink provided for a heat-generating element on the secondary side.

Furthermore, although the heat sink HS is used as a component for shielding the photocoupler PC1 in the switching power supply unit 1 shown in FIG. 1, other metallic plates or any other known material that may shield a photocoupler against electromagnetic waves may be used.

Figure 3:
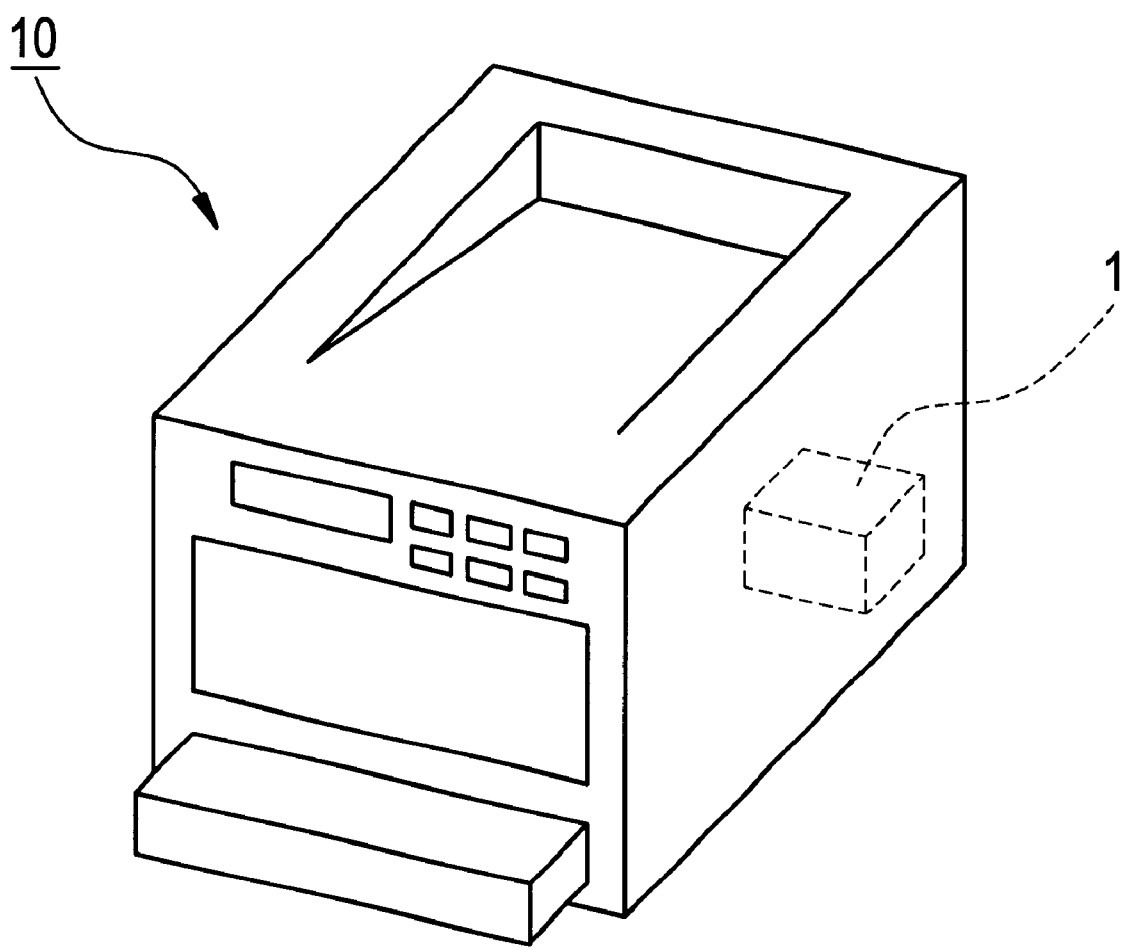
FIG. 3 is a perspective view of an electronic apparatus according to a preferred embodiment of the present invention.

FIG. 3 is a perspective view of an electronic apparatus according to another preferred embodiment of the present invention. Referring to FIG. 3, a printer 10, which is an example of electronic apparatus, preferably includes the switching power supply unit 1 according to the above-described preferred embodiment of the present invention as a power supply circuit of the printer 10.

By using the switching power supply unit 1 according to preferred embodiments of the present invention, the printer 10 is not susceptible to incorrect operation caused by electromagnetic waves emanating from cellular phones or electronic apparatuses, thereby achieving stable operation.

The electronic apparatus according to the present invention is not limited to a printer, and may be any type of electronic apparatus which operates in an environment where interference by external electromagnetic waves may occur and which requires a switching power supply unit, such as a notebook computer and a portable information terminal.

While preferred embodiments of the present invention have been described above, variations thereto will occur to those skilled in the art within the scope of the present inventive concepts, which are delineated by the following claims.

What is claimed is:

1. A switching power supply unit comprising:

a transformer having at least a primary winding and a secondary winding;

a switching element connected in series with said primary winding;

a control circuit connected to a control terminal of said switching element;

a rectifying circuit connected to said secondary winding;

an output voltage detecting circuit connected to said rectifying circuit;

a photocoupler arranged to feed an output voltage detected by said output voltage detecting circuit back to said control circuit; and a shield member arranged to electromagnetically shield said photocoupler.

2. A switching power supply unit according to claim 1, wherein said photocoupler is covered by said shield member on the top side thereof.

3. A switching power supply unit according to claim 1, wherein said photocoupler is surrounded by said shield member.

4. A switching power supply unit according to claim 1, wherein said shield member is a heat sink.

5. A switching power supply unit according to claim 1, wherein the rectifying circuit includes at least one diode.

6. A switching power supply unit according to claim 1, wherein the photocoupler includes a light-emitting device and a phototransistor.

7. An electronic apparatus comprising a switching power supply unit according to claim 1.

8. A switching power supply unit according to claim 2, wherein said shield member is a heat sink.

9. A switching power supply unit according to claim 3, wherein said shield member is a heat sink.

10. An electronic apparatus comprising a switching power supply unit according to claim 2.

11. An electronic apparatus comprising a switching power supply unit according to claim 3.

12. An electronic apparatus comprising a switching power supply unit according to claim 4.

13. An electronic apparatus comprising a switching power supply unit according to claim 5.

14. An electronic apparatus comprising a switching power supply unit according to claim 6.

15. An electronic apparatus according to claim 7, wherein the electronic apparatus is a printer.

16. An electronic apparatus according to claim 10, wherein the electronic apparatus is a printer.

17. An electronic apparatus according to claim 11, wherein the electronic apparatus is a printer.

18. An electronic apparatus according to claim 12, wherein the electronic apparatus is a printer.

19. An electronic apparatus according to claim 13, wherein the electronic apparatus is a printer.

20. An electronic apparatus according to claim 14, wherein the electronic apparatus is a printer.

\* \* \* \* \*